(12) United States Patent
Jaquette et al.

(10) Patent No.: US 7,398,351 B2
(45) Date of Patent: Jul. 8, 2008

(54) METHOD AND SYSTEM FOR CONTROLLING ACCESS TO DATA OF A TAPE DATA STORAGE MEDIUM USING ENCRYPTION/DECRYPTION OF METADATA

(75) Inventors: Glen A. Jaquette, Tucson, AZ (US); James M. Karp, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 201 days.

(21) Appl. No.: 11/438,830

(22) Filed: May 23, 2006

(65) Prior Publication Data

US 2007/0276991 A1   Nov. 29, 2007

(51) Int. Cl.
*G06F 12/14* (2006.01)

(52) U.S. Cl. .................. 711/111; 711/163; 711/164; 713/182; 713/185; 714/735; 714/736; 714/763; 714/766; 714/771

(58) Field of Classification Search .............. 711/111, 711/163, 164; 713/182, 183, 184, 185; 714/702, 714/735, 736, 763, 766, 771
See application file for complete search history.

(56) References Cited

U.S. PATENT DOCUMENTS

| | | | |
|---|---|---|---|
| 4,150,404 A | 4/1979 | Tercic et al. | |
| 4,488,001 A | 12/1984 | Cooley et al. | |
| 5,235,641 A | 8/1993 | Nozawa et al. | |
| 5,442,706 A | 8/1995 | Kung | |
| 5,623,546 A | 4/1997 | Hardy et al. | |
| 2003/0074319 A1 | 4/2003 | Jaquette | |
| 2004/0230815 A1 | 11/2004 | Goodman et al. | |
| 2007/0112896 A1* | 5/2007 | Sandorfi et al. ............. | 707/204 |

* cited by examiner

*Primary Examiner*—Jack A Lane
(74) *Attorney, Agent, or Firm*—Dillon & Yudell LLP

(57) ABSTRACT

A method, system, and machine-readable medium for controlling access to data of a tape data storage medium are disclosed. In accordance with one embodiment, a method is provided which comprises conveying data access control metadata from a tape cartridge comprising a tape data storage medium to a host, receiving decrypted metadata from the host, comparing a checksum value determined utilizing the decrypted metadata with checksum data stored within the tape cartridge; and processing a request to access the tape data storage medium received from the host based upon a comparison of the checksum value and checksum data. In the described method embodiment, the data access control metadata comprises encrypted metadata corresponding to a data storage parameter, where data is stored within the tape data storage medium utilizing the data storage parameter and the decrypted metadata is generated by the host utilizing the encrypted metadata.

8 Claims, 6 Drawing Sheets

METHOD AND SYSTEM FOR CONTROLLING ACCESS TO DATA OF A TAPE DATA STORAGE MEDIUM USING ENCRYPTION/DECRYPTION OF METADATA

BACKGROUND

1. Technical Field

Embodiments of the present invention relate generally to data storage and management and more particularly to a method and system for controlling access to data of a tape data storage medium.

2. Description of the Related Art

As the use of data processing systems has become more prevalent, the techniques used to store and manage data produced by such data processing systems have evolved. One mechanism for storing and providing access to such data is the tape storage system. A conventional tape storage system comprises a tape storage drive such as the 3592 Enterprise Tape System provided by International Business Machines Corporation of Armonk, N.Y. and a removable tape data storage medium upon which data may be stored. It is frequently desirable to control access (e.g., to prevent data from being accessed or to otherwise obscure the data's content or meaning) to data stored within such removable tape data storage media in order to prevent unauthorized access.

As removable tape data storage media are, by definition, removable, they are subject to loss, theft, or other circumstances in which the physical possession of the media is compromised. For example, removable tape data storage media are frequently transported from a primary physical site (e.g., where an associated tape storage drive utilized to store data initially within the removable tape data storage media is located) to a secondary physical site (e.g., for archive or interchange purposes). Since the physical possession of tape data storage media is so difficult to control, conventional tape storage systems utilize various logical techniques to prevent unauthorized access to stored data.

One logical, rather than physical, technique for protecting removable tape data storage media-stored data from unauthorized access involves the use of full data encryption utilizing an encryption standard such as the Advanced Encryption Standard (AES) or Data Encryption Standard (DES). Data to be stored within a tape data storage medium is encrypted by a host data processing system using a data encryption key prior to being transferred to an associated tape storage drive such that the original data may not be obtained from the tape storage drive without first performing an inverse "decryption" operation utilizing an associated decryption key. Utilizing a symmetric encryption system or method, a single "symmetric" key is utilized for both the encryption and decryption operations. By contrast, in "asymmetric" encryption systems or methods, distinct, although related keys are utilized for encryption and decryption operations such that it is computationally infeasible to decrypt data which has been encrypted, even when the key utilized for encryption is known.

While full data encryption may be used to provide significant protection to the content of encrypted data, it suffers from a number of significant drawbacks. More specifically, although data encryption protects access to the content or substance of data, it does not prevent access to the encrypted data itself. Accordingly, if an associated decryption key's value were compromised or sufficient computational resources could be applied to analyze the encrypted data, the data's content could be determined. Moreover, the resultant "encrypted" data generated by conventional encryption techniques is relatively random and consequently may not be compressed to the same extent as unencrypted data. The processing and storage of such compression resistant data may incur a significant storage capacity and data processing performance penalty. Additionally, the performance of encryption and decryption operations is so computationally intensive that specialized hardware may be required, causing tape storage drive designers and providers to select between affordability and performance.

SUMMARY

A method and system for controlling access to data of a tape data storage medium are provided herein. In accordance with one embodiment of the present invention, a method is provided which comprises conveying data access control metadata from a tape cartridge comprising a tape data storage medium to a host data processing system, receiving decrypted metadata from the host data processing system, comparing a checksum value determined utilizing the decrypted metadata with checksum data stored within the tape cartridge; and processing a request to access the tape data storage medium received from the host data processing system based upon a comparison of the checksum value and checksum data. In the described method embodiment, the data access control metadata comprises encrypted metadata corresponding to a data storage parameter, where data is stored within the tape data storage medium utilizing the data storage parameter and the decrypted metadata is generated by the host data processing system utilizing the encrypted metadata.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways including implementation in hardware, software, or a combination thereof, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous features and advantages made apparent to those skilled in the art by referencing the accompanying drawings in which.

The use of the same or similar reference symbols within the accompanying drawings is intended to indicate similar or identical items.

DETAILED DESCRIPTION OF AN ILLUSTRATIVE EMBODIMENT

The following sets forth a detailed description of at least the best contemplated mode for carrying out the one or more systems, devices and/or processes described herein. The description is intended to be illustrative and should not be taken to be limiting.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment," "an embodiment," or "embodiments" are intended to indicate that a particular feature, structure, or characteristic described in connection with the embodiment is included in at least one embodiment of the present invention. The appearance of such phrases in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Embodiments of the present invention provide a method and system for controlling access to data of a tape data storage medium utilizing attributes of an existing tape data storage medium storage format, thus providing enhanced data security without requiring additional (e.g., encryption) hardware as compared to enterprises including conventional host data processing and tape storage systems. Embodiments of the present invention may provide such functionality utilizing one or more of data channel randomization within unique seed values (USVs), access point encoding, tape cartridge access prevention, and the key-encrypted, secure storage of one or more data access control metadata fields. In conventional tape storage systems USVs are utilized in combination with "randomizer circuits" to prevent the encoding and recording of a single data value (e.g., logical '1' or logical '0') serially along a tape data storage medium track.

Embodiments of the present invention may be utilized in a complimentary or alternative manner with host data processing system and/or tape storage drive-based full data encryption. For example, tape storage drive-based data encryption may be substituted for data channel randomization in order to provide greater data protection.

Figure 1:
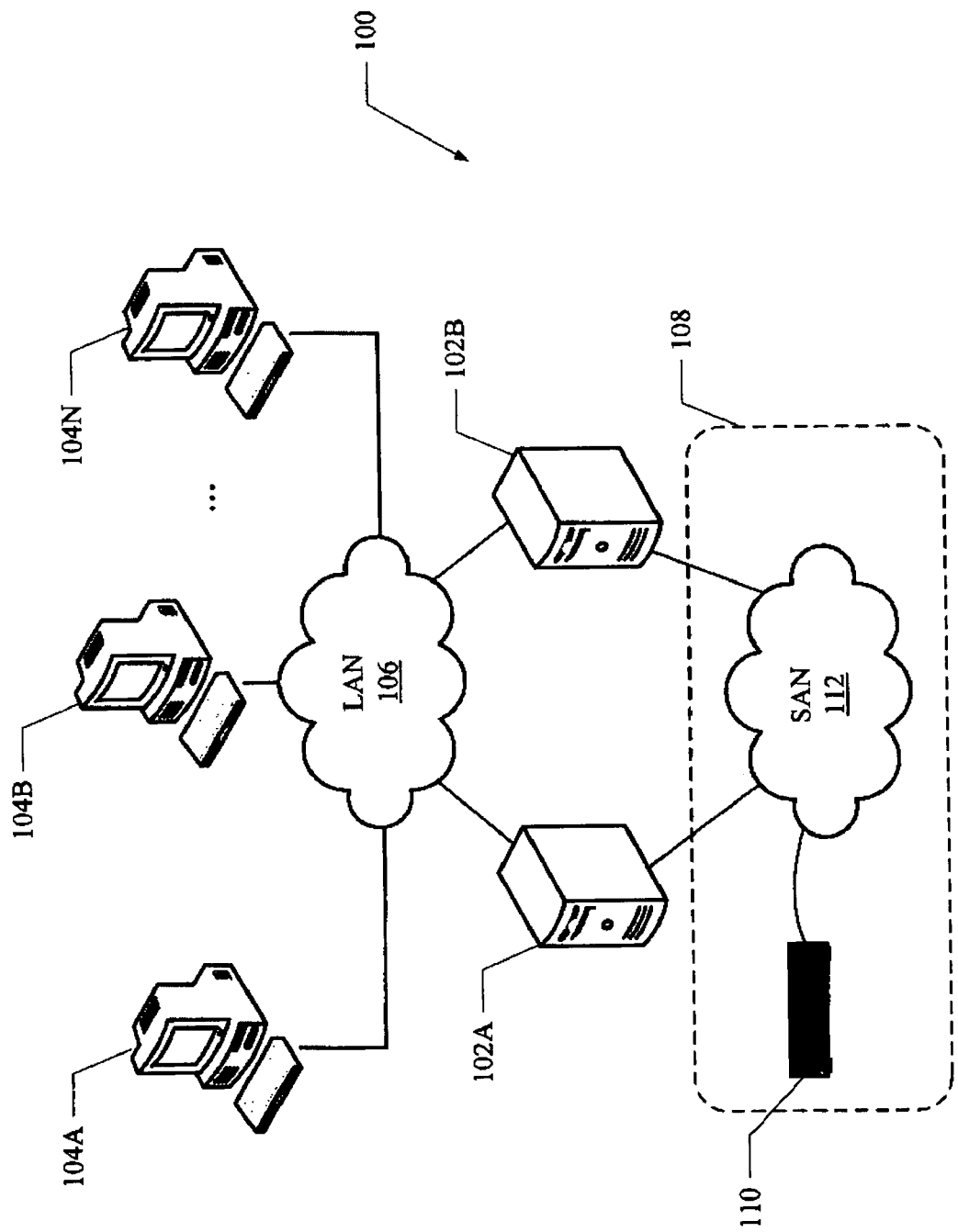
FIG. 1 illustrates a high-level block-diagram representation of an enterprise including a tape storage drive apparatus according to an embodiment of the present invention.

FIG. 1 illustrates a high-level block-diagram representation of an enterprise including a tape storage drive apparatus according to an embodiment of the present invention. Enterprise 100 of FIG. 1 comprises a number of host data processing systems (e.g., server data processing systems 102 and associated client data processing systems 104) which are communicatively coupled together via a first network interconnect (e.g., local area network or "LAN" interconnect 106) as shown. Server data processing systems 102 of the depicted embodiment are further coupled to a storage subsystem 108 including a number of data storage devices and a second network interconnect (e.g., storage area network or "SAN" interconnect 112).

In the exemplary embodiment of FIG. 1, storage subsystem 108 is depicted as including a single tape data storage device 110. In alternative embodiments of the present invention however, storage subsystem 108 may include any number and type of data storage device (e.g., individual disk drives, tape drives, disk arrays, tape arrays, RAID array subsystems, robotic tape libraries, filers, file servers) communicatively coupled together and to server data processing systems 102 via a storage interconnect (SAN interconnect 112) such as an FC switch, switch fabric, arbitrated loop, or the like. Server data processing system 102A of the embodiment of FIG. 1 comprises an application server (e.g., a database server) to provide core operational functionality to one or more of client data processing systems 104A-104N (where "N" is a positive integer) and server data processing system 102B comprises another server (e.g., a cluster failover server, load-balancing server, backup server, or the like).

Tape data storage device 110 of the depicted embodiment is coupled to SAN interconnect 112 via a communication link as shown. Each communication link may comprise any of a number of communication media capable of transmitting one or more electrical, optical, and/or acoustical propagated signals (e.g., copper wiring, fiber optic cable, or the like) between SAN interconnect 112 and a communication port of tape data storage device 110.

In the illustrated embodiment, tape data storage device 110 and server data processing system 102A are configured with sufficient functionality to control and/or manage the access provided to data of a tape data storage medium within a tape cartridge coupled with tape data storage device 110 as will be further described herein. Utilizing one or more embodiments of the present invention, access to data of a tape data storage medium so-associated with tape data storage device may be restricted and/or host data processing systems accessing such data may be identified.

While a conventional SAN-type interconnect (SAN interconnect 112) has been specifically depicted in the embodiment of FIG. 1, in alternative embodiments of the present invention other interconnects (e.g., direct connection, local, metropolitan, and/or wide-area networks) and other protocols (e.g., FICON, ESCON, SSA, or the like) may be utilized. Moreover, while a particular number and arrangement of elements have been illustrated with respect to enterprise 100 of FIG. 1, it should be appreciated that embodiments of the present invention are not limited to enterprises, systems, or data storage devices having any particular number, type, or arrangement of components other than as explicitly recited herein and so may encompass a wide variety of system types, architectures, and form factors.

Figure 2A:
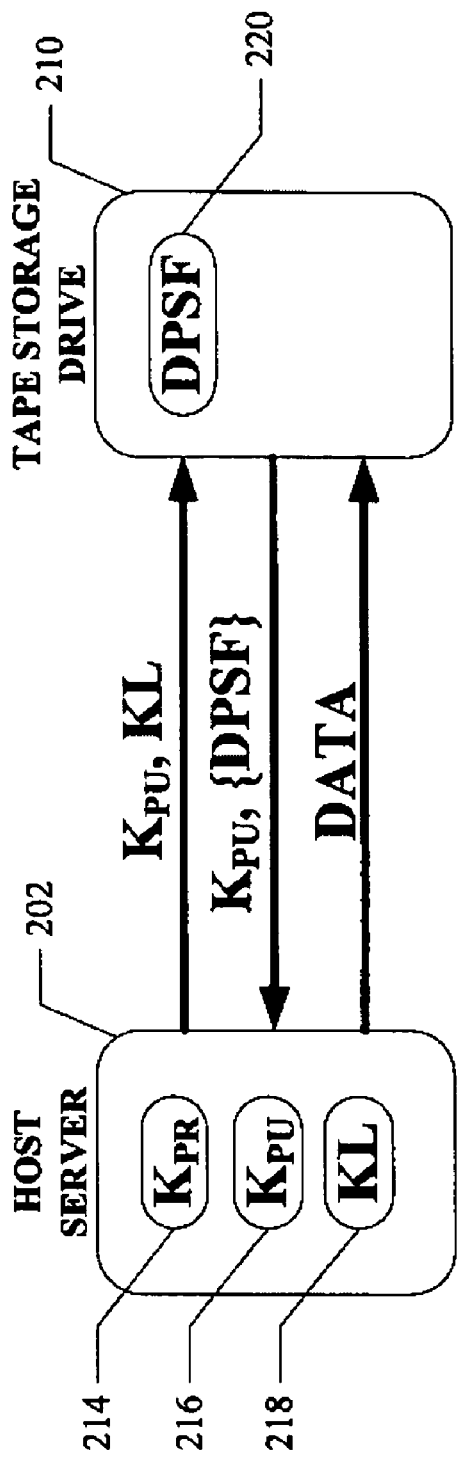
FIGS. 2A and 2B illustrate functional interaction between a host data processing system and a tape storage drive apparatus according to an embodiment of the present invention during data write and data read input/output (I/O) operations, respectively.
Figure 2B:
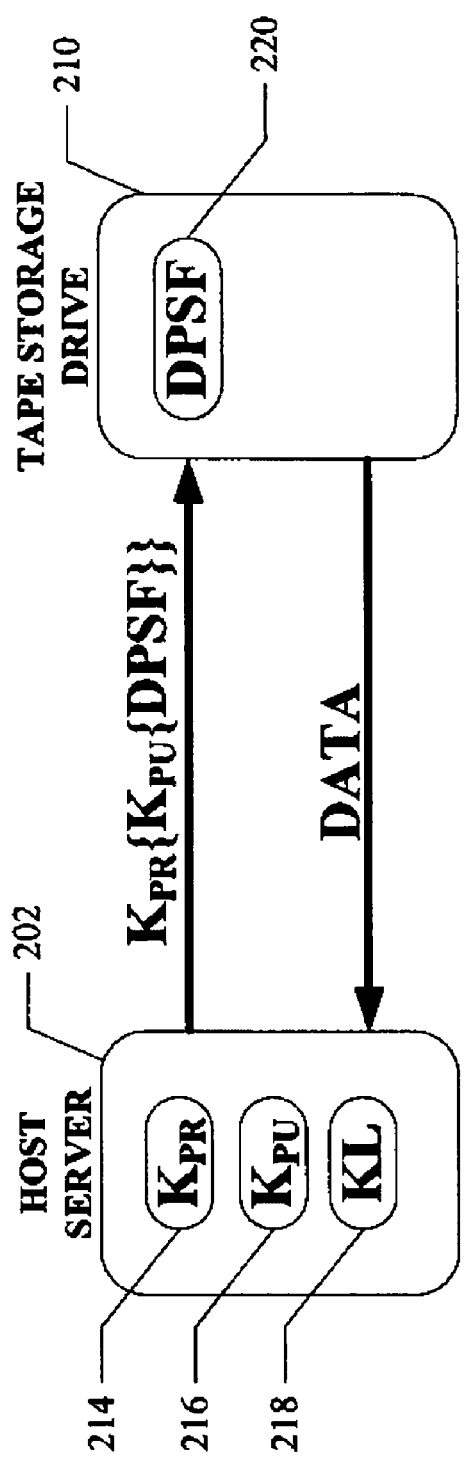

FIGS. 2A and 2B illustrate functional interaction between a host data processing system and a tape storage drive apparatus according to an embodiment of the present invention during data write and data read input/output (I/O) operations, respectively. More specifically, FIGS. 2A and 2B may be utilized to illustrate the interaction between elements of an enterprise such as enterprise 100 (e.g., server data processing system 102 and tape data storage device 110). In FIG. 2A, a host server 202 is communicatively coupled to and in communication with, a tape storage drive 210. Host server 202 of the depicted embodiment comprises a key pair including a private key ($K_{PR}$) 214 and a public key ($K_{PU}$) 216 as well as a key label 218 which may be utilized to identify and/or index one or more of the aforementioned keys. Similarly, tape storage drive 210 comprises a data protection security feature (DPSF) data structure 220 as shown. In one embodiment of the present invention a DPSF data structure is provided which comprises an enable byte, an 8-byte key label, an encrypted 30-byte USV, a 4-byte cyclic redundancy check (CRC) value corresponding to the unencrypted USV, and a 4-byte DPSF-wide data structure CRC value.

In the described embodiment, the enable byte, USV, and CRC values are utilized primarily by a tape storage drive. For example, an enable byte may be used to indicate whether a data protection security feature is activated for a given drive, tape cartridge, partition, file, or the like. A USV may be utilized to randomize data to be stored within a tape data storage medium. CRC values can be used to detect errors in the transmission of data via a communication link and/or, in the case of the described USV CRC, to perform a checksum comparison and control access to a tape data storage medium as further described herein. Conversely, the described key label is provided and utilized primarily by a host data processing system to index or identify a drive, tape cartridge, partition, file to which data/access protection may or has been applied.

In operation, host server 202 and tape storage drive 210 communicate to facilitate a data write I/O operation as depicted in FIG. 2A. Host server 202 transmits $K_{PU}$ 216 and Key Label 218 to tape storage drive 210 as shown. In response, tape storage drive 210 encrypts DPSF data structure 220 utilizing $K_{PU}$ 216 and transmits the resultant encrypted data back to host server 202. Once the encrypted data structure is received, host server 202 may transmit a write operation request and associated data to be written back to tape storage drive 210. While the communication operations depicted in FIG. 2A have been described as occurring in a sequential fashion, in one or more embodiments of the present invention such operations may be performed in another sequence or partially or completely in parallel.

Moreover, while the transmission of "data" has been described within the context of FIG. 2A, it should be appreciated that the actual transmission or "relocation" of such data is not required by all embodiments. Rather, embodiments of the present invention are contemplated in which the content or meaning of such data is conveyed rather than the actual data itself using any of a number of techniques or mechanisms. For example, a copy of the described data may be transmitted, data representing (e.g., encoding, referencing, or the like) the described data may be transmitted, or the like.

In operation, host server 202 and tape storage drive 210 also communicate to facilitate a data read I/O operation as depicted in FIG. 2B. Preceding or in parallel with the transmission of a data read I/O operation request, host server 202 decrypts a previously-received encrypted DPSF data structure utilizing corresponding private key $K_{PR}$ 21 and transmits the resultant decrypted data to tape storage drive 210 as shown. In response, tape storage drive 210 generates a checksum value over at least part of the decrypted data and compares the generated checksum value(s) to locally-stored checksum data. If the checksum value(s) correctly correspond to the stored checksum data, the read operation request may be granted and associated data responsively returned as shown.

Figure 3:
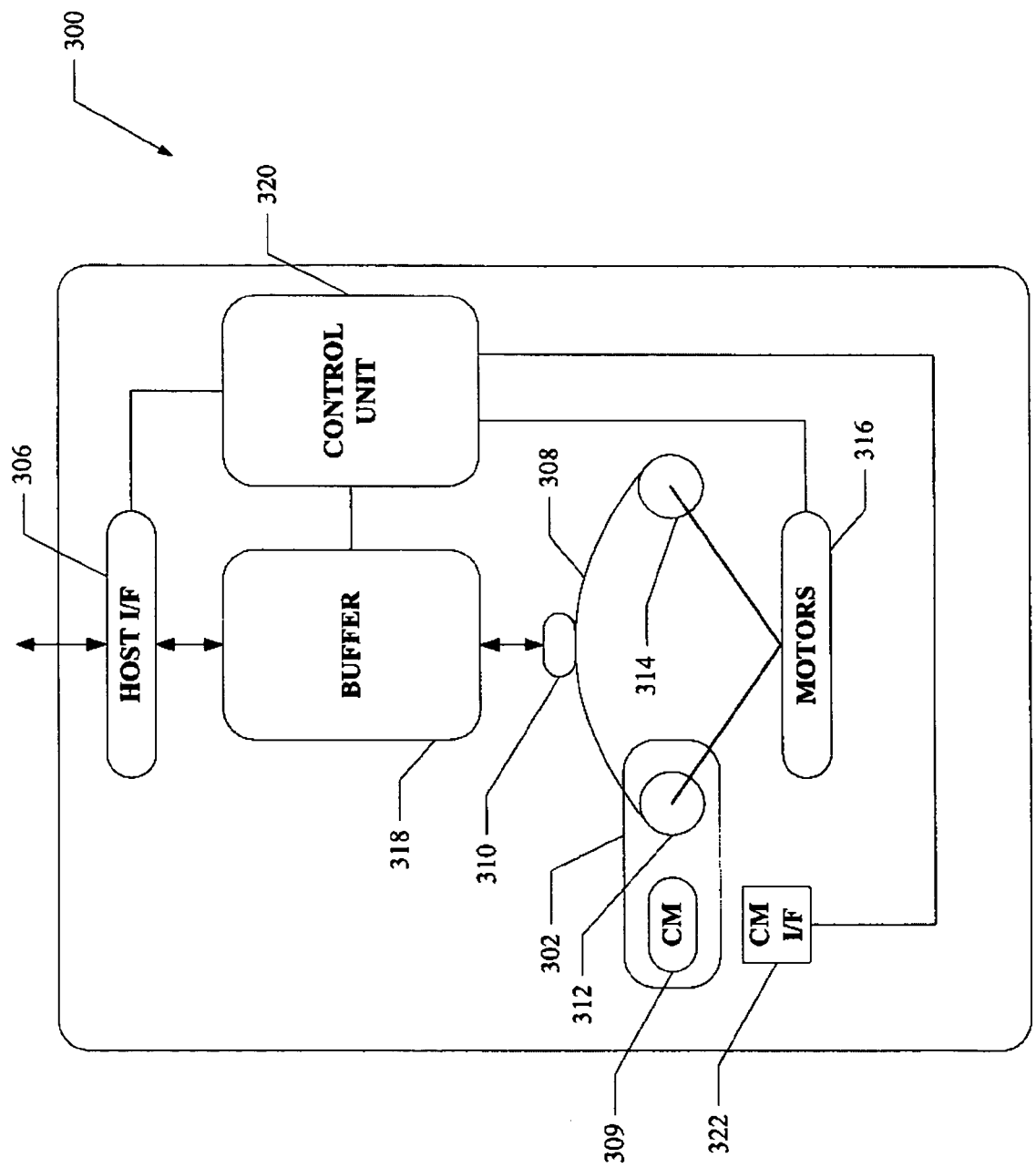
FIG. 3 illustrates a high-level block-diagram representation of a tape storage drive apparatus according to an embodiment of the present invention.

FIG. 3 illustrates a high-level block-diagram representation of a tape storage drive apparatus according to an embodiment of the present invention. In the depicted embodiment, tape data storage device 300 comprises a removable data storage tape cartridge 302 and a communication interface (e.g., host data processing system interface (I/F) 306) to communicatively couple tape data storage device 300 to one or more host data processing systems or associated communication channels (e.g., SAN interconnect 112).

In the embodiment of FIG. 3, host data processing system I/F 306 is configured to receive input/output (I/O) operation requests (e.g., "read" and/or "write" requests), and process such requests in an appropriate manner to control or "manage" access to a tape data storage medium 308 (e.g., magnetic tape) of removable data storage tape cartridge 302 as described herein.

In addition to tape data storage medium 308, data storage tape cartridge 302 of the illustrated embodiment comprises a cartridge memory (CM) module 309. CM module 309 of the illustrated embodiment comprises a passive, contactless silicon storage device utilized to store data about the tape cartridge (removable data storage tape cartridge 302) in which it resides. Exemplary data may include, for example, data indicating the associated tape cartridge's volume serial number (VOLSER), the "type" of data storage medium within the cartridge, and the data, if any, which is stored thereon.

Tape data storage medium 308 of removable data storage tape cartridge 302 is routed in proximity to a tape access (e.g., read/write) head 310 utilizing media transport reels 312 and 314 and one or more media transport motors 316 as shown. In the illustrated embodiment, tape access head 310 is configured to read data from and write data to tape data storage medium 308 and to temporarily store or "stage" such data within a buffer 318 (e.g., one or more "read-ahead" or staging buffers).

In the embodiment of FIG. 3, tape data storage device 300 further comprises a controller or control unit 320. Control unit 320 controls and manages data flow, formatting, and data storage subsystem operation via control signals issued to one or more of host data processing system I/F 306, buffer 318, media transport motors 316, and/or CM I/F 322 utilized to access CM 309 in order to cause one or more method or process embodiments of the present invention or operations thereof to be performed. In another embodiment, such control functionality may be incorporated into one or more of host data processing system I/F 306, and control unit 320.

Figure 4:
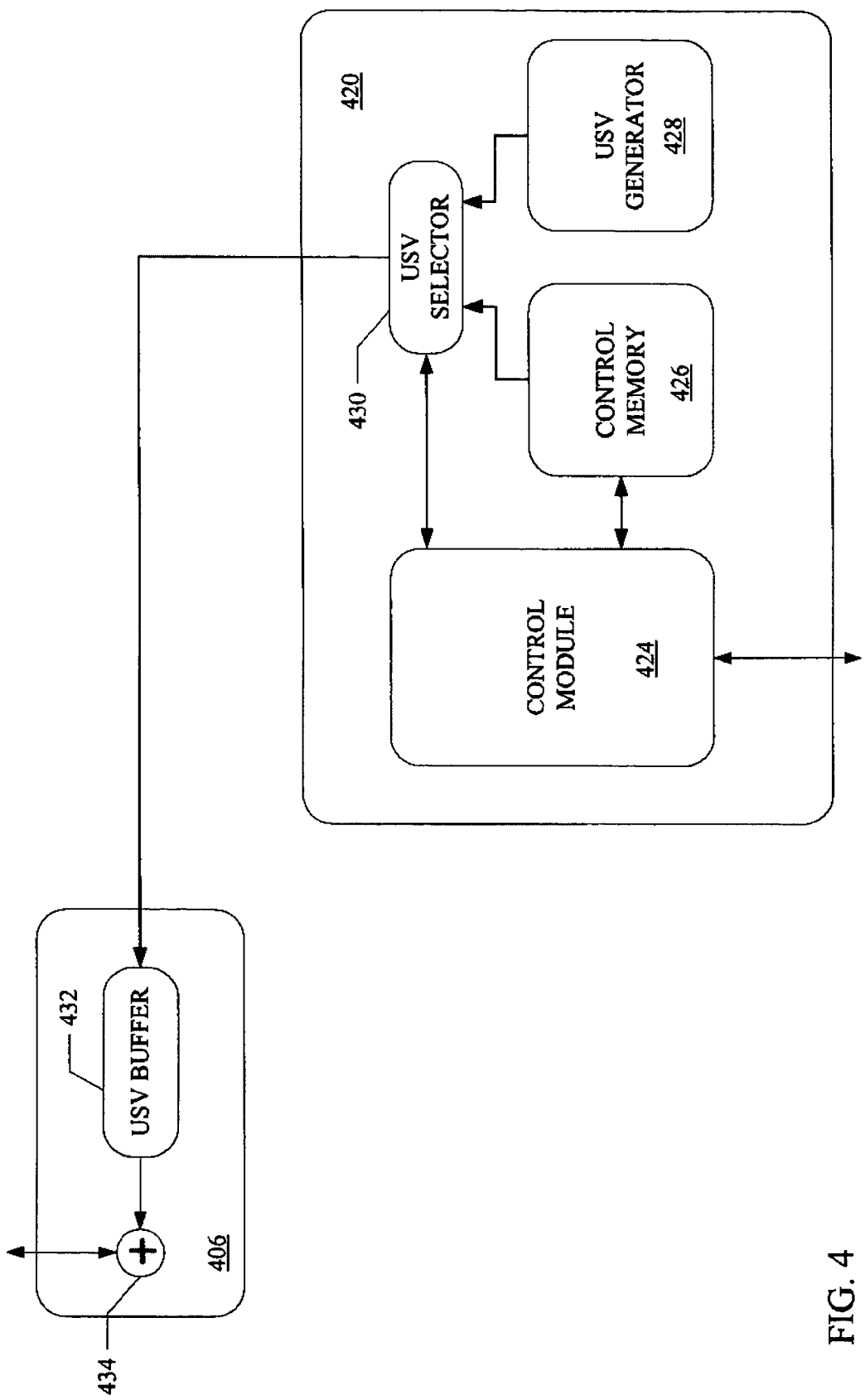
FIG. 4 illustrates more specific block-diagram representations of a control unit and host interface of a tape storage drive apparatus such as that illustrated by FIG. 3.

FIG. 4 illustrates more specific block-diagram representations of a control unit and host interface of a tape storage drive apparatus such as that illustrated by FIG. 3. Control unit 420 of the depicted embodiment includes a control module 424 (e.g., a state machine, microcontroller, microprocessor, or the like) communicatively coupled both to external elements (e.g., host data processing system I/F 306, buffer 318, media transport motors 316, and/or CM I/F 322) and internal elements (e.g., control memory element 426 and USV selector 430). In the illustrated embodiment, control module 424 is utilized to perform one or more methods or processes of the present invention as described further herein. Control unit 420 further comprises a USV generator 428 coupled to USV selector 430 as shown. In operation, USV selector 430 is provided with and selects between a newly-generated USV value by USV generator 428 and a previously-created USV value stored within control memory element 426 under the control of control module 424. According to one embodiment of the present invention, USV generator 428 utilizes an asynchronous phase technique to generate a unique seed value.

USV selector 430 is in turn communicatively coupled to provide a selected USV value as output to USV buffer 432 within host data processing system I/F 406 as shown. The value stored within USV buffer 432 is the logically combined (e.g., via an exclusive OR operation) with host data processing system-provided data to be stored within an associated tape data storage medium. In one embodiment of the present invention, USV buffer 432 comprises a 15-bit feedback shift register storing the received USV value at the beginning of a randomization interval in which the two most-significant USV value bits are logically combined and provided/shifted in at the least-significant bit position.

In the described embodiment, the original USV, the length of the shift register, and the feedback operator determine the content of the output bitstream which is random and a function of the input bitstream sequentially encoded by the operator and USV. The seed value is preset at the start of every randomization interval (e.g., C1 codeword pair). On readback, an incoming random bitstream cannot be decoded without the proper seed value being preset/loaded on the proper boundary.

The result of reading with an incorrect seed is an uncorrectable error correction code (ECC) error since all track data will be incorrect in the decoded data buffer in a random manner. Thus a tape storage drive implementing an embodiment of the present invention cannot and will not attempt to pass stored data to a requesting host data processing system. In various alternative embodiments, USVs may be generated at a dataset, write pass, or wrap interval for additional protection.

Figure 5:
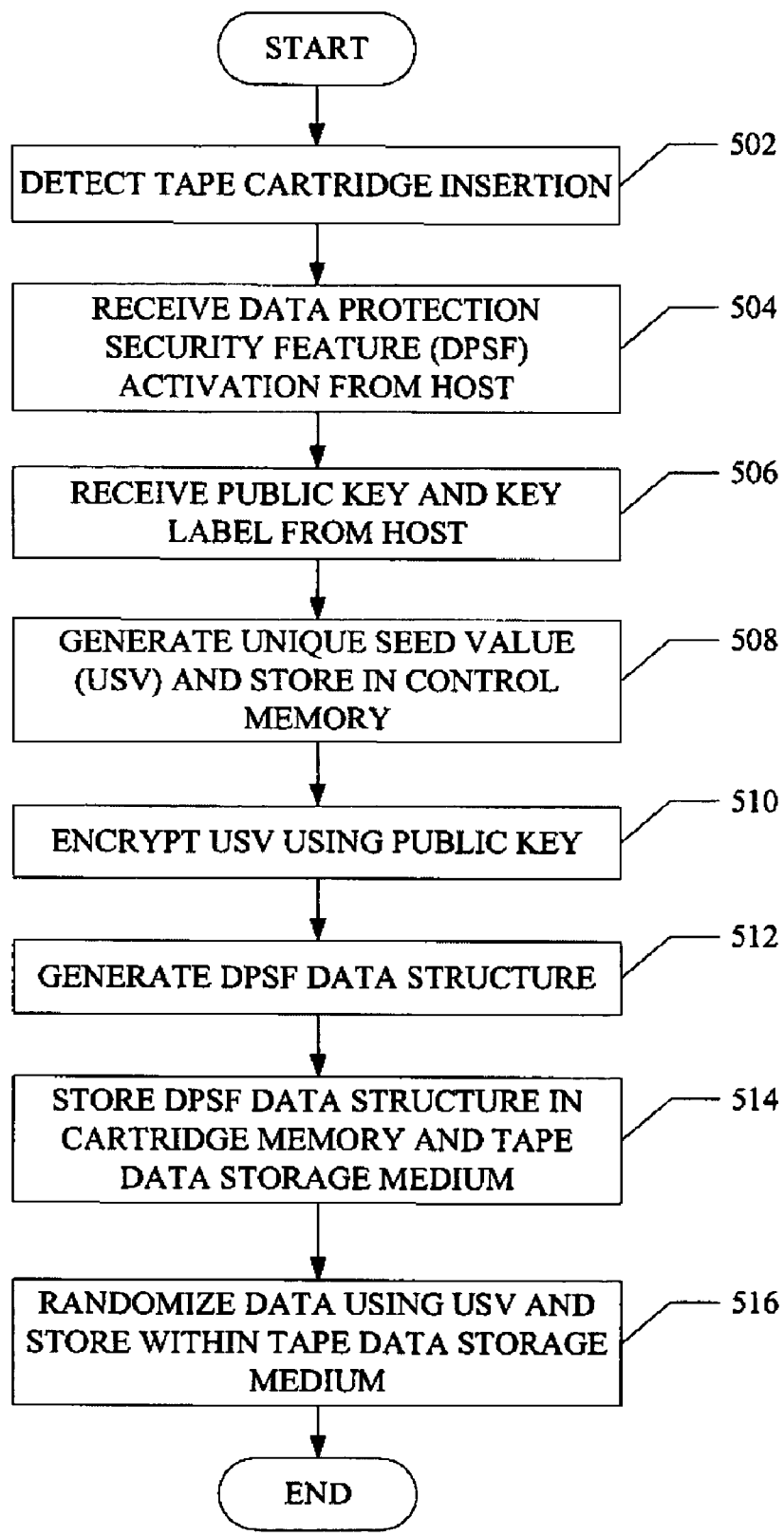
FIG. 5 illustrates a flow diagram of process to perform a data write I/O operation according to an embodiment of the present invention.

FIG. 5 illustrates a flow diagram of process to perform a data write I/O operation according to an embodiment of the present invention. Initially in the illustrated process embodiment, the insertion of a tape cartridge is detected (process block 502). A data protection security feature (DPSF) activation signal is then received from a host data processing system (process block 504). In one embodiment of the present invention, such an activation is received via a Mode Select command when a tape data storage medium associated with the inserted tape cartridge is positioned at a beginning of partition (BOP) element or character.

After a host activation signal has been received, additional host data including a public encryption key and a key label are similarly received from a host data processing system (process block 506). Thereafter, a unique seed value (USV) is generated and stored in control memory (process block 508) (e.g., control memory element 426 of FIG. 4). Once it has been stored locally, a generated USV may be securely utilized within a tape storage drive to randomize/format data to be stored within a tape data storage medium. While one copy of the generated USV is stored as described, another copy of the USV is encrypted utilizing the previously-received public key (process block 510) such that it will only be accessible utilizing a corresponding private key securely held by the host data processing system which provided the public key and key label. Using the encrypted USV data, a data protection security feature (DPSF) data structure is generated (process block 512). In one embodiment, such as DPSF data structure comprises an enable byte, the previously-received key label, the encrypted USV, a cyclic redundancy check (CRC) value corresponding to the unencrypted USV value, and a DPSF data structure-wide CRC value as previously-described herein.

Once generated, the DPSF data structure is stored (process block 514). In the depicted embodiment of FIG. 5, the DPSF (meta)data is stored both in cartridge memory (CM) and within the tape data storage medium itself (e.g., within metadata storage structures such as the format identifier (FID), end of data (EOD) marker, Housekeeping Dataset (HKD), or the like). The storage of DPSF metadata in different locations as described provides protection in a variety of ways. In one embodiment, multiple copies of DPSF metadata are utilized to validate the content of the DPSF to be used. Similarly, should one copy of the DPSF data structure be destroyed or corrupted, another copy may be used. Thereafter in the illustrated embodiment of FIG. 5, the locally-stored USV value is utilized to randomize data which is then stored elsewhere within the tape data storage medium (process block 516).

Figure 6:
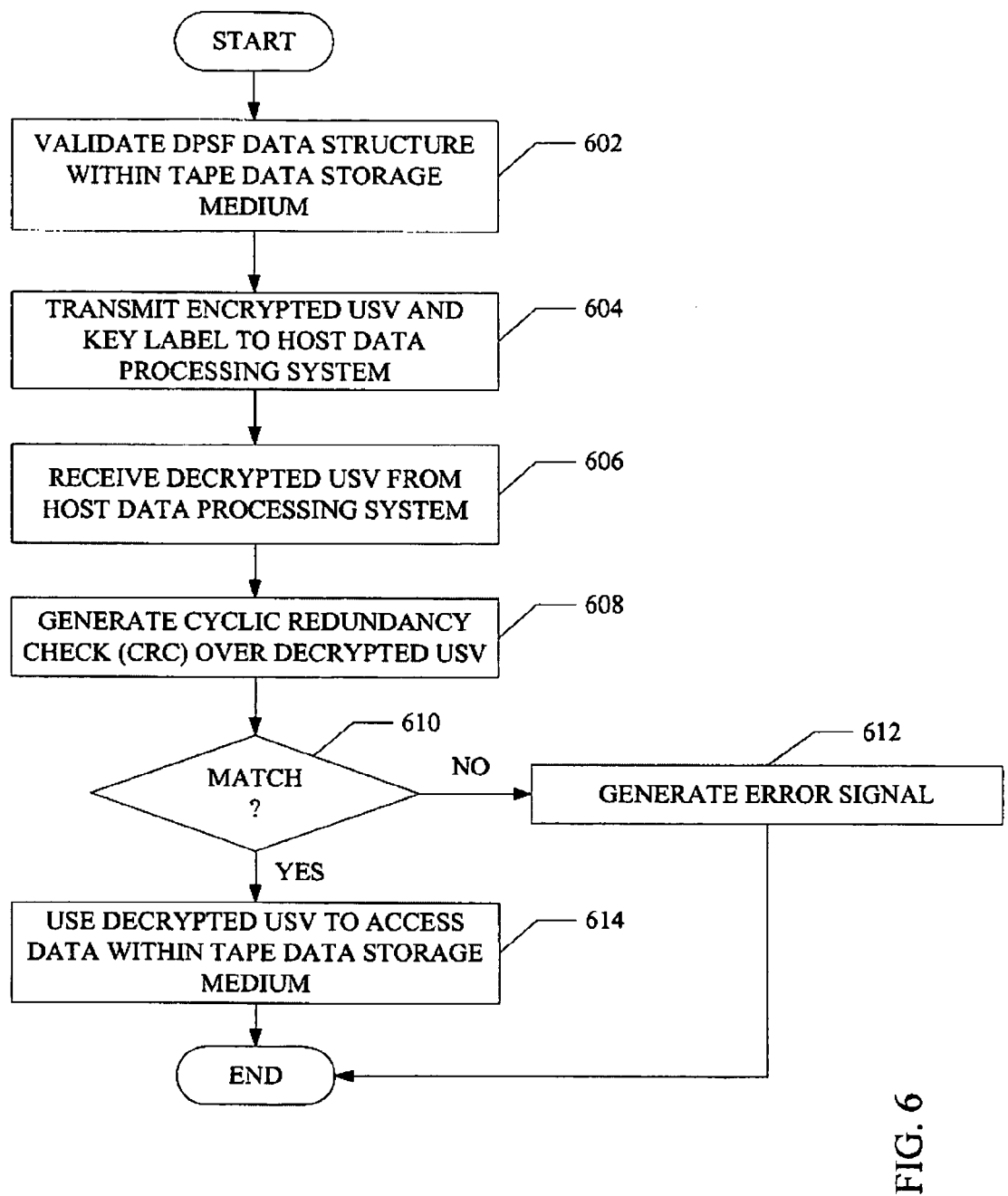
FIG. 6 illustrates a flow diagram of process to perform a data read I/O operation according to an embodiment of the present invention.

FIG. 6 illustrates a flow diagram of process to perform a data read I/O operation according to an embodiment of the present invention. In the depicted process embodiment, a previously-stored (e.g., see process block 514 of FIG. 5) DPSF data structure is initially validated (process block 602). In one embodiment, such validation is performed by comparing multiple copies of DPSF (meta)data stored, for example, within CM and tape data storage medium internal drive datasets (e.g. FID, EOD, HKD, or the like). If the DPSF data copies match, either copy may be utilized, if however a mismatch in the DPSF data copies is detected, the DPSF data may be deemed invalid and appropriate action taken (e.g., abort/reject all I/O operations/requests, default to the DPSF data stored within the tape data store medium, or the like).

Once one of the available DPSF (meta)data copies is selected, DPSF data specifying the key label and encrypted USV is extracted and transmitted to a host data processing system (process block 604). In one embodiment of the present invention, this transmission is performed via a "Mode Sense" page means. In response to the described transmission, a decrypted USV is received from the host data processing system to which the transmission was directed (processing block 606). In another embodiment, all I/O operations (e.g., read/write/locate, or the like) are postponed or "fenced" until a correct DPSF response is received.

Thereafter, a checksum value (e.g., a CRC value) is determined using the received decrypted USV (process block 608) which is then compared with corresponding checksum data (e.g., a locally-stored USV CRC data value) to detect a match (process block 610). In response to a determination that the generated checksum value and stored checksum data match, the generated checksum value is utilized to access (e.g., decrypt, de-randomize, unformat, or the like) requested data stored within the tape data storage medium (process block 614). Otherwise, in response to the detection of a mismatch condition, an error signal may be generated (process block 612) as shown in the depicted embodiment.

Although the operations depicted in FIGS. 5 and 6 have been described with respect to specific system elements, the actual elements utilized to perform such operations are immaterial to process embodiments of the present invention. Moreover, in alternative embodiments, such operations may be performed by any data storage device or subcomponent thereof. Similarly, while the described flow diagrams indicate a particular order and a specific granularity of process operations, in alternative embodiments the illustrated order may be varied (e.g., process operations may be performed in another order or performed substantially in parallel) and one or more of the process operations may be coalesced or fragmented. Similarly, addition process operations may be added where necessary in alternative embodiments of the present invention.

Because written datasets are encoded with a USV, tape cartridge and/or tape data storage medium tampering is not a significant problem utilizing one or more embodiments of the present invention. If a tape cartridge's CM is removed and replaced with a blank or unprotected cartridge CM, default use of DPSF data from the tape data storage medium where possible and where mismatch is detected allows a protected tape to be read with a corrupted or missing CM. Moreover, default use of the tape data storage medium DPSF (meta)data similarly affords protection if such storage media is "spliced" with a different but valid DPSF since the data-storing portions of the tape data storage media will remain unreadable using the spliced (and consequently incorrect or unspecified) USV value. Furthermore, if enough tape is removed (e.g., in an attempt to excise that portion of the tape indication DPSF protection and including DPSF data) such that internal datasets (e.g., FID/HKD) cannot be found, the modified tape cartridge will be treated as an unreadable blank tape irrespective of any valid CM content.

Embodiments of the present invention may include software, information processing hardware, and various processing operations further described herein. The features and process operations of various invention embodiments may be embodied in executable instructions embodied within a machine-readable medium such as a data processing system memory, a storage device, a communication device or medium, or the like. A machine-readable medium may include any mechanism that provides (i.e., stores and/or transmits) data in a form readable by a machine (e.g., a data processing system).

For example, a machine-readable medium includes but is not limited to: random access memory (RAM); read only memory (ROM); magnetic storage media; optical storage media; flash memory devices; electrical, optical, and/or acoustical propagated signals (e.g., carrier waves, infrared signals, digital signals, etc.); or the like. The described executable instructions can be used to cause a general or special purpose processor, programmed with the instructions, to perform operations, methods or processes of the present invention. Alternatively, the features or operations of the present invention may be performed by specific hardware components that contain hard-wired logic for performing such operations, or by any combination of programmed data processing components and custom hardware components.

While the present invention has been described in the context of fully functional data processing system those skilled in the art will appreciate that the present invention is capable of being distributed as a program product in a variety of forms and applies equally regardless of the particular type of signal bearing media used to carry out the distribution. Examples of such signal bearing media include recordable media such as floppy disks and CD-ROM, transmission type media such as digital and analog communications links, as well as media storage and distribution systems developed in the future. Embodiments of the present invention may similarly be implemented utilizing software modules used to perform certain operations or tasks. The described software modules may include script, batch, or other executable files and may be stored on a machine-readable or computer-readable medium. Thus, the modules may be stored within a computer system memory to configure a data processing or computer system to perform one or more functions of a software module. Other new and various types of machine or computer-readable storage media may be used to store the modules discussed herein.

Although particular embodiments of the present invention have been shown and described, it will be obvious to those skilled in the art that, based upon the teachings herein, changes and modifications may be made without departing from this invention and its broader aspects. For example, in alternative embodiments the "unit" of protection is reduced from partition to file level with added CM structures with different USVs used for each unit of protection. In another embodiment, USV values are stepped or changed by a tape storage drive at predetermined intervals (e.g., dataset, wrap, or file) for additional protection. In yet another embodiment "downstream" dataset USVs are stored in "upstream" datasets for additional protection. In still another embodiment, an additional key or key pair is maintained by a tape storage drive and utilized to encrypt all transfers of the USV to the drive for further protection. Consequently, the appended claims are to encompass within their scope all such changes and modifications as are within the true spirit and scope of this invention and embodiments of the invention are intended to be limited only by the scope of the appended claims, giving full cognizance to equivalents in all respects.

What is claimed is:

1. A method of controlling access to a tape data storage medium, said method comprising:
    conveying data access control metadata from a tape cartridge comprising said tape data storage medium to a host data processing system, wherein
        said data access control metadata comprises encrypted metadata corresponding to a data storage parameter, and
        data is stored within said tape data storage medium utilizing said data storage parameter;
    receiving decrypted metadata from said host data processing system, wherein said decrypted metadata is generated by said host data processing system utilizing said encrypted metadata;
    comparing a checksum value determined utilizing said decrypted metadata with checksum data stored within said tape cartridge; and
    processing a request to access said tape data storage medium received from said host data processing system based upon a comparison of said checksum value and said checksum data.

2. The method of claim 1, wherein
    said data access control metadata comprises first data access control metadata stored within said tape data storage medium and second data access control metadata stored within a cartridge memory element of said tape cartridge, and
    said conveying comprises
        conveying said first data access control metadata from said tape data storage medium in response to a determination that said first data access control metadata and said second data access control metadata differ.

3. The method of claim 1, wherein said processing comprises:
    denying said request to access said tape data storage medium in response to a determination that said checksum value and said checksum data differ; and
    providing access to said tape data storage utilizing said decrypted metadata in response to a determination that said checksum value and said checksum data match.

4. The method of claim 1, wherein
    said data storage parameter comprises a unique seed value,
    said unique seed value is utilized by a tape storage drive to randomize said data stored within said tape data storage medium.

5. The method of claim 1, wherein
    said data storage parameter uniquely corresponds to a data partition defined within said tape data storage medium.

6. A method of controlling access to a tape data storage medium, said method comprising:
    storing a data storage parameter within a secure storage element of a tape storage drive;
    receiving an encryption key from a host data processing system;
    generating encrypted metadata corresponding to said data storage parameter utilizing said encryption key;
    storing said encrypted metadata within said tape data storage medium; and processing a request to access said tape data storage medium received from said host data processing system utilizing said data storage parameter; wherein said data storage parameter comprises a unique see value; and said processing comprises:

generating randomized data utilizing data received from said host data processing system and said unique seed value; and storing said randomized data within said tape data storage medium.

7. The method of claim 6, further comprising:

storing said encrypted metadata within a cartridge memory element of a tape cartridge comprising said tape data storage medium.

8. The method of claim 6, wherein said data storage parameter uniquely corresponds to a data partition defined within said tape data storage medium.

\* \* \* \* \*